(12) United States Patent
Knüsel

(10) Patent No.: US 12,198,579 B2
(45) Date of Patent: Jan. 14, 2025

(54) SMARTBOARD AND SET FOR DIGITIZING WORKSHOP RESULTS

(71) Applicant: TRIHOW AG, Rotkreuz (CH)

(72) Inventor: Beat Knüsel, Immensee (CH)

(73) Assignee: TRIHOW AG, Rotkreuz (CH)

( * ) Notice: Subject to any disclaimer, the term of this patent is extended or adjusted under 35 U.S.C. 154(b) by 0 days.

(21) Appl. No.: 18/244,373

(22) Filed: Sep. 11, 2023

(65) Prior Publication Data

US 2024/0005821 A1     Jan. 4, 2024

Related U.S. Application Data

(63) Continuation of application No. 17/295,951, filed as application No. PCT/EP2019/081768 on Nov. 19, 2019, now Pat. No. 11,756,456.

(30) Foreign Application Priority Data

Nov. 22, 2018   (CH) ..................... 01445/18

(51) Int. Cl.
   *G09F 7/04*      (2006.01)
   *G06K 7/10*      (2006.01)
   *G09F 1/10*      (2006.01)

(52) U.S. Cl.
   CPC ........... *G09F 7/04* (2013.01); *G06K 7/10336* (2013.01); *G06K 7/10376* (2013.01); *G09F 1/10* (2013.01)

(58) Field of Classification Search
   CPC .. G06Q 10/06; G09F 7/04; G09F 1/10; G06K 7/10336; G06K 7/10376
   See application file for complete search history.

(56) References Cited

U.S. PATENT DOCUMENTS

| | | | | |
|---|---|---|---|---|
| 3,287,841 A | * | 11/1966 | Spragg | B62B 3/1408 40/658 |
| 4,229,726 A | * | 10/1980 | Deaton | G08G 1/015 377/9 |
| 5,250,789 A | * | 10/1993 | Johnsen | B62B 3/1424 705/14.4 |
| 5,295,342 A | * | 3/1994 | Roche | G09F 7/04 428/455 |

(Continued)

FOREIGN PATENT DOCUMENTS

DE         3148885 A1      6/1983

OTHER PUBLICATIONS

Written Opinion dated Apr. 17, 2020 for PCT/EP2019/081768, filed Nov. 19, 2019.

(Continued)

*Primary Examiner* — David R Dunn
*Assistant Examiner* — Christopher E Veraa
(74) *Attorney, Agent, or Firm* — Fleit Intellectual Property Law; Paul D. Bianco

(57) ABSTRACT

A smartboard for digitising workshop results includes a first and a second surface, which are designed parallel to one another. Between these surfaces pockets are arranged in parallel to each other. Each pocket has electrically interconnected printplates arranged in it, which include NFC receivers in an array. Each pocket also has magnets arranged in it in an array. The printplates of adjacent pockets are electronically connected with each other. A first of the printplates is provided with a port for a power supply and for a data output.

21 Claims, 4 Drawing Sheets

(56) References Cited

U.S. PATENT DOCUMENTS

| | | | | |
|---|---|---|---|---|
| 5,389,945 A * | 2/1995 | Sheridon | G09F 9/372 | 345/84 |
| 5,693,914 A * | 12/1997 | Ogawa | G06F 3/046 | 345/173 |
| 5,850,214 A * | 12/1998 | McNally | G06F 15/0225 | 345/173 |
| 6,462,733 B1 * | 10/2002 | Murakami | G06F 3/033 | 345/184 |
| 6,600,482 B1 * | 7/2003 | Leone, Jr. | G06V 30/1423 | 345/179 |
| 6,697,056 B1 * | 2/2004 | Bergelson | G06V 30/1423 | 345/178 |
| 6,710,791 B1 * | 3/2004 | Kodama | G07G 1/0081 | 715/201 |
| 7,198,341 B1 * | 4/2007 | Rast | G09F 3/00 | 347/4 |
| 7,492,946 B2 * | 2/2009 | Elder | G06F 40/171 | 382/187 |
| 8,228,299 B1 * | 7/2012 | Maloney | G06Q 20/10 | 345/173 |
| 8,591,055 B2 * | 11/2013 | Leanza | B42F 9/004 | 40/124.02 |
| 9,239,719 B1 * | 1/2016 | Feinstein | G06F 8/70 | |
| 10,857,450 B1 * | 12/2020 | Aman | A63F 13/213 | |
| 11,756,456 B2 * | 9/2023 | Knüsel | G09F 1/10 | 40/621 |
| 2004/0032428 A1 * | 2/2004 | Pilu | G06F 16/955 | 715/764 |
| 2005/0053769 A1 * | 3/2005 | Imblum | F41H 13/0025 | 428/170 |
| 2006/0007189 A1 * | 1/2006 | Gaines, III | G06V 30/1423 | 382/187 |
| 2006/0015532 A1 * | 1/2006 | Mizell | G06Q 10/06 | |
| 2007/0176780 A1 * | 8/2007 | Hart | G06Q 10/06 | 340/572.1 |
| 2007/0211036 A1 * | 9/2007 | Perkins | G06F 3/0412 | 345/173 |
| 2008/0239369 A1 * | 10/2008 | Matsunaga | G06F 3/1273 | 358/1.15 |
| 2009/0256701 A1 * | 10/2009 | Chamberlain | G06Q 10/06 | 340/539.12 |
| 2010/0191611 A1 * | 7/2010 | Biro | G06Q 30/0601 | 705/26.1 |
| 2010/0321480 A1 * | 12/2010 | Berman | G09F 27/00 | 348/E7.091 |
| 2011/0137671 A1 * | 6/2011 | Scarola | G16H 40/67 | 705/2 |
| 2011/0252946 A1 * | 10/2011 | Armstrong | G09B 15/023 | 84/483.2 |
| 2012/0162127 A1 * | 6/2012 | Onoda | G06F 3/04883 | 345/174 |
| 2012/0204307 A1 * | 8/2012 | De Mattei | H04N 21/431 | 2/69 |
| 2012/0231427 A1 * | 9/2012 | Kitamura | G09B 19/00 | 434/219 |
| 2013/0021261 A1 * | 1/2013 | Wilson | G06F 15/0291 | 345/1.3 |
| 2013/0022330 A1 * | 1/2013 | Carter | H04N 21/84 | 386/224 |
| 2013/0084801 A1 * | 4/2013 | Royston | H04B 5/72 | 455/41.1 |
| 2015/0024372 A1 * | 1/2015 | McHugh | B43L 3/00 | 434/430 |
| 2016/0116976 A1 * | 4/2016 | Russell | G06F 3/0202 | 340/10.5 |
| 2016/0300089 A1 * | 10/2016 | Arsenault | G06K 7/10356 | |
| 2016/0343264 A1 * | 11/2016 | Murdock | G06F 3/167 | |
| 2016/0357720 A1 * | 12/2016 | Thimbleby | G06F 3/1423 | |
| 2017/0123554 A1 * | 5/2017 | Villar | G06F 3/0445 | |
| 2017/0124364 A1 * | 5/2017 | Villar | G06K 7/10326 | |
| 2018/0136781 A1 * | 5/2018 | Fujioka | G06F 3/04162 | |
| 2018/0250586 A1 * | 9/2018 | Bellingham | H01Q 21/0025 | |
| 2020/0356254 A1 * | 11/2020 | Missig | G06F 3/0485 | |
| 2021/0090703 A1 * | 3/2021 | Natarajan | A61J 7/04 | |
| 2021/0398460 A1 * | 12/2021 | Knüsel | G09B 15/023 | |
| 2022/0032167 A1 * | 2/2022 | McCoy | B25J 11/003 | |

OTHER PUBLICATIONS

Mikko Pyykkönen et al. "Activity pad: teaching tool combining tangible interaction and affordance of paper" Proceedings of the 2013 ACM International Conference on Interactive Tabletops and Surfaces, ITS '13, Jan. 1, 2013, pp. 135-144.

International Search Report (dated Apr. 2, 2020) and Written Opinion for PCT/EP2019/081768, filed Nov. 19, 2019.

International Preliminary Report of Patentability for PCT/EP2019/081768 dated May 25, 2021.

* cited by examiner

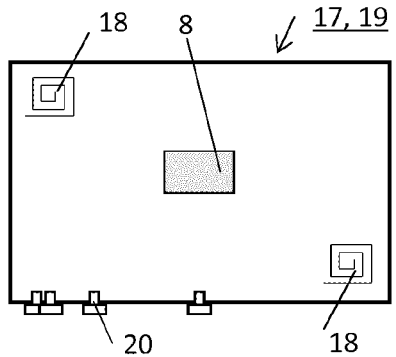
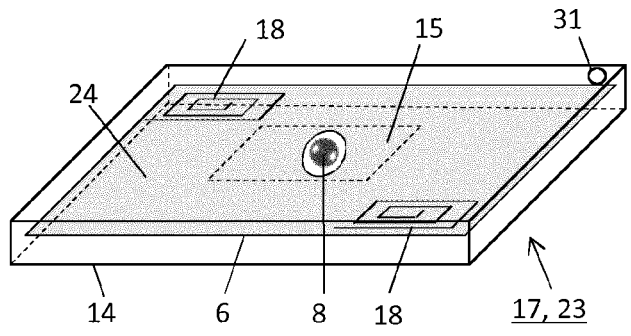
Fig. 6    Fig. 7
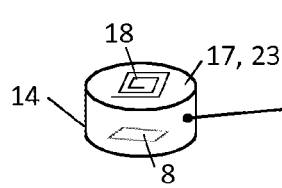
Fig. 8A
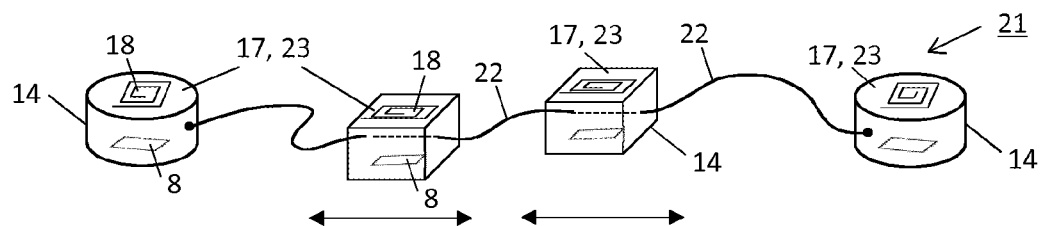
Fig. 8B
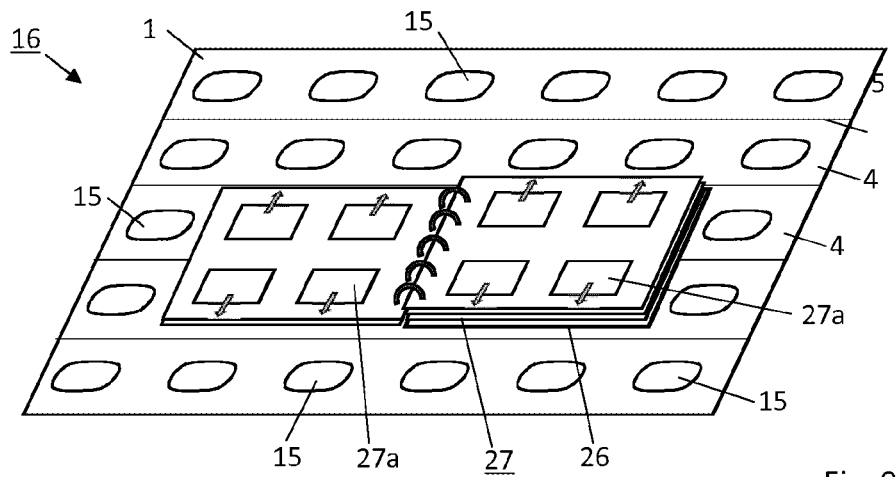
Fig. 9

SMARTBOARD AND SET FOR DIGITIZING WORKSHOP RESULTS

TECHNICAL FIELD

The invention relates to a smartboard for digitising workshop results including a first and a second surface, which are designed parallel to one another. The invention also relates to different sets including such smartboards.

STATE OF THE ART

Work surfaces used by workshops are for example whiteboards, pinwalls, blackboards or tables. Participants for example note down their ideas on pieces of paper and attach them to these conventional work surfaces such as whiteboards or pinwalls, so that all can see them. Subsequently evaluation is performed, duplicate ideas are removed, similar ones are pooled, important ones are embellished with further ideas. Depending on the purpose of the workshop sequences are determined and/or priorities are set and finally tasks and responsibilities are assigned.

Such workshops are frequently accompanied by facilitators, equipped with facilitator's cases, which are well equipped with self-adhesive post-its of different colours and shapes, coloured dots, magnetic buttons, markers, scissors, pins etc. The work results can at best, be recorded photographically. Following completion however, they are not used any further, the work surface is again emptied.

On the other hand electronic whiteboards, here called smartboards, are known, which are equipped with electronics for performing various additional functions. There are known to be boards, which like a tablet comprise a touchscreen, character recognition and so on. These allow previously produced graphics to be supplemented by handwritten remarks and to be stored in amended form. Such smartboards are however very expensive and cannot, in contrast to a facilitator's case, be simply brought along by a facilitator.

SUMMARY OF THE INVENTION

It is the objective of the present invention to describe a smartboard of the kind mentioned in the beginning for digitising workshop results, which is portable and which can send work results in digitised form to a computer for the computer to further process them.

The invention is solved by the characteristics of the first patent claim. According to the invention a plurality of pockets are arranged in parallel to one another between the first and the second surface of a smartboard described at the beginning, wherein each pocket has one or more electrically interconnected printplates are arranged in it, which include a plurality of NFC receivers in an array. Moreover each pocket has a plurality of magnets in form of ferromagnets or permanent magnets arranged in it in an array, wherein the printplates of adjacent pockets are electronically connected to each other, preferably meanderingly. A first of the printplates is moreover provided with a port for a power supply and for a data output.

A set according to the invention includes such a smartboard and at least two or more objects, wherein each object includes at least one magnet in form of a permanent magnet or ferromagnet as well as at least one, preferably two RFID transponders.

BRIEF DESCRIPTION OF THE DRAWINGS

The invention is illustrated below in various drawings and explained in more detail with the aid of reference symbols explained further below, in which:

FIG. 6 shows a schematic view of an inventive object in form of a card;

FIG. 7 shows a schematic view of an inventive object in form of a can with an internal space;

FIGS. 8A, 8B show a schematic view of an inventive connecting element in two embodiments;

FIG. 9 shows a schematic view of an inventive smartbook on a smartboard;

WAYS OF IMPLEMENTING THE INVENTION

Figures 1A, 1B:
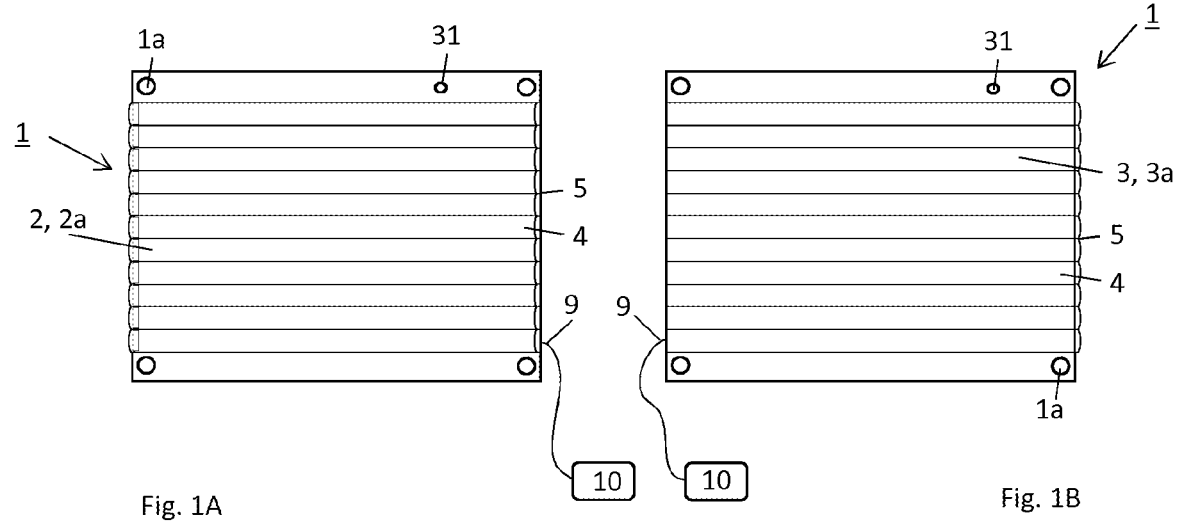
FIG. 1A, 1B shows a schematic depiction of an inventive smartboard connected to a computer with a view onto the first surface (FIG. 1A) and onto the second surface (FIG. 1B)

FIGS. 1A and 1B each show a smartboard 1 for digitising workshop results, including a first surface 2 and a second surface 3, which are designed parallel to one another.

Such a smartboard 1 can be placed either on a table or hung from a wall or a conventional whiteboard, wherein this can be accomplished by means of eyelets 1a provided on the smartboard 1. Working with the smartboard 1 is possible horizontally or vertically.

Figure 2:
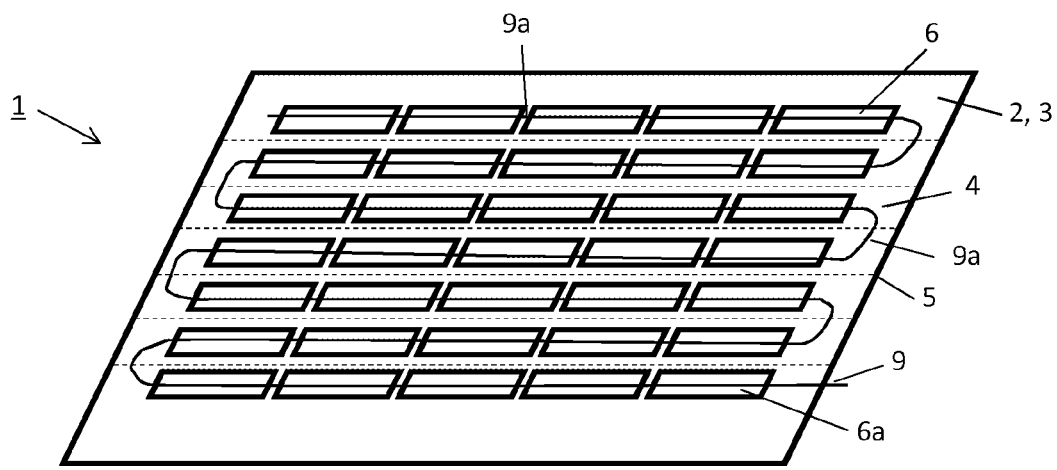
FIG. 2 shows a schematic internal view of such a smartboard.
Figure 3A:
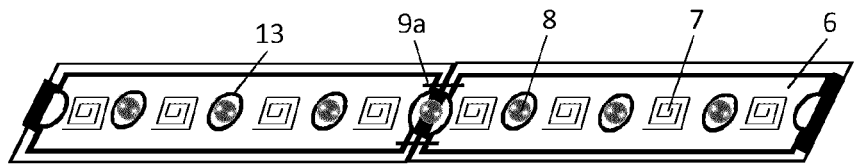
FIGS. 3A, 3B show a schematic partial view of an internal view of a smartboard in two alternative forms.
Figure 3B:
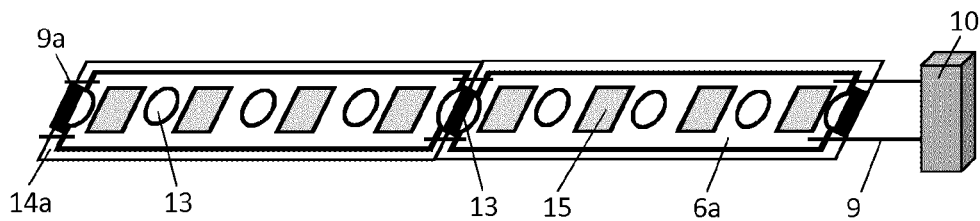
Figure 4:
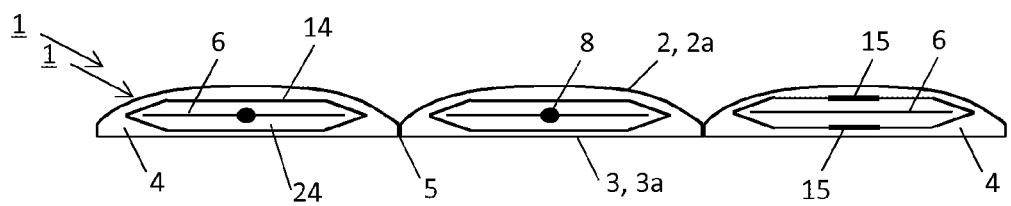
FIG. 4 shows a schematically drawn cross-section through a partial region of a smartboard, at different points.

FIG. 2 shows the inside of such a smartboard 1, FIGS. 3A and 3B show an enlargement of individual segments thereof. Between these surfaces 2, 3 a plurality of pockets 4 are arranged in parallel to one another, which are connected with each other at joints 5. One or more electrically interconnected printplates 6 are arranged in each pocket 4, the printplates including a plurality of NFC receivers 7 in an array. Also, each pocket 4 has arranged in it a plurality of magnets 8 in an array in form of ferromagnets or permanent magnets. They may be mounted in recesses 13 provided in the printplates 6 for this purpose. If permanent magnets, in particular rod-shaped ones, are chosen as magnets 8, it is advantageous if these are mounted in such a way that they are capable of aligning themselves. Preferably the NFC receivers 7 and the magnets 8 are arranged respectively in an alternating manner in the array. As depicted in FIGS. 3A and 3B, printplates 6 within a pocket 4 can for example be plugged into each other at electrical connections 9a, so that they are electronically contacted with each other. FIG. 4 shows a cross-section of individual pockets 4 in the region of the printplates 6 and the magnets 8.

The printplates 6 of adjacent pockets 4 are connected with each other at electronic connections 9a, preferably meanderingly as depicted in FIG. 2. A first of the printplates 6a is provided with a port 9 for the connection to a power supply 10 and for a data output for the purpose of transmitting data for example to a computer 10.

Moreover one or more switches 15, preferably pressure switches, which can be triggered by a user, may be arranged in the pockets 4. In a preferred embodiment each NFC receiver 7 is assigned its own switch 15, as depicted in FIG. 3B. Depending on the construction of the switch it may be designed such that it can be actuated optionally from the first and/or the second surface 2, 3 by a user pressing it, or two switches 15 may be arranged opposite each other, as shown in the right-hand part of FIG. 4. Each switch 15 is also connected to the port 9 for data output.

Figure 5:
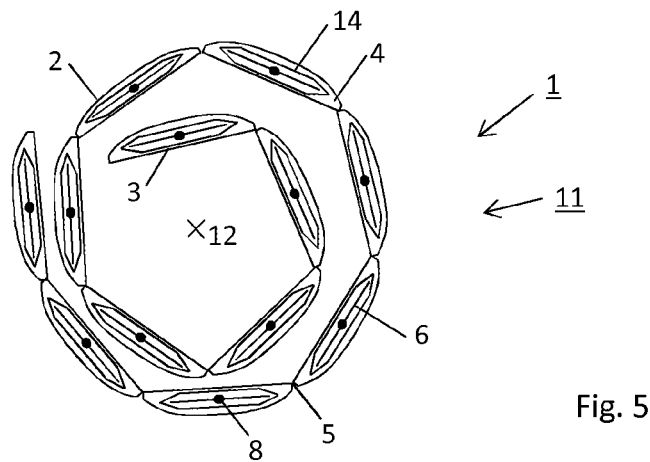
FIG. 5 shows a schematically drawn cross-section through a rolled-up smartboard.

Since the pockets are hingedly connected with each other, the smartboard 1 can be rolled into a roll 11 with an axis 12 parallel to the elongate pockets 4, as shown in FIG. 5. Preferably the pockets 4 comprise pressure-proof housings 14, in which the printplates 6 and the magnets 8 are protectively arranged. Ultimately the switches 15 are attached to these housings 14 so as to be actuated from outside, for example by pressing them.

Preferably at least the first surface 2 consists of a flexible material, in particular a textile material such as a felt mat 2a, so that this surface 2 can be perforated by a pin or a needle. Thus it is easy to write information on a slip of paper and pin it to the smartboard 1.

Alternatively or additionally thereto at least the second surface 3 may consist of a pressure-proof material, preferably of plastic plates 3a. Preferably this is designed to be low-gap when the smartboard 1 is completely unwound. This second surface 3 can be easily written on with wipe-off markers, and self-adhesive post-its can be attached to it. It is also possible to design both surfaces 2, 3 in an identical manner.

Such a smartboard 1 is now suitable for working with. Information can be attached in different ways to the smartboard 1. The described or equipped smartboard 1 can be expanded in a modular manner by further modules 17, 19, 21, 23, 25, 28 described here, which together with the smartboard 1 form a set 16. Each of these modules 17, 19, 21, 23, 25, 28 can however also be used on its own or in connection with other such modules 17, 19, 21, 23, 25, 28 or with components not named here. The purpose shall always be to organise, store and forward information while working as a group or on a project. As a rule a coach would lead and accompany such group work and explain to the participants the method of working with the smartboard 1 and the modules 17, 21, 23, 25, 28.

Thus for example information can be written onto magnetically attached modules 17, 19, 21, 23, 25, which adhere to the magnets 8 in the smartboard 1. The information could also be placed on top of each other, collated into groups, or be organised into a logical sequence. Additional information can also be attached directly to the smartboard 1.

A set 16 includes for example a smartboard 1 as well as two or more objects 17 representing modules, as depicted in FIG. 6 or 7. As a rule a plurality of such objects 17 is used. Each of these objects 17 includes at least one magnet 8 in form of a permanent magnet or a ferromagnet as well as at least one, preferably two RFID transponders 18. Optionally the objects 17 may also include a switch 15, in particular a pressure switch.

In a first preferred embodiment as per FIG. 6 one or more of these objects 17 may be realised as cards 19. The cards 19 have for example the size and shape of credit cards or business cards. In a preferred embodiment they comprise a coding 20, for example in form of notches. Such codings 20 can help to separate cards 19, which belong to a group and which all comprise the same coding 20, from other cards 19. To this end the cards 19 are placed into boxes provided for this purpose, which comprise grooves on the bottom, which correspond to the notches 20 of a respective group. Cards 19, which do not belong to this group and therefore have a different coding 20, abut against at least one of the grooves and as a result stand out in relation to the other cards 19, which at these points comprise a notch 20. This allows them to be easily sorted out.

An additional colour coding on the side could for example mark the sequence of the cards 19, if the colour coding of each subsequent card 19 is slightly offset from that of the previous card. This makes it very easy to control the sequence.

As an alternative to the design as a card 19 the objects 17 could be designed as a can 23 with a housing 24 and with an interior space 24, as shown in FIG. 7. A can 23 is easier to grip than a card 19. The interior space 24 of each can 23 may accommodate the one or more RFID transponders 18 and the magnet 8, and a switch 15 may in addition be attached to the can 23. The magnet 8 is preferably realised as a permanent magnet and mounted in the interior space 24 such that it can freely align itself. It is also possible to provide a number of magnets 8. Further suitable electronic components can be arranged on a printplate 6. The can 23 may for example have a LED 31, which gives feedback following actuation of the switch 15. The supply for this can be run via the RFID transponders 18 from the smartboard 1. The cans 23 protect the components arranged in the interior space 24 against the impact of external forces and contamination.

Such objects 17 or cards 19 may already have been written on or be written on whilst working. Thanks to their magnets 8 they adhere to the smartboard 1. Their RFID transponders 18 correspond with the NFC receivers 7. This allows a computer 10 attached to the smartboard 1 to be sent the ID number of the card 19 as well as the position on the smartboard 1, to which it adheres. The card 19 may be assigned further properties, which are stored in a database, which can be accessed by the computer 10. In addition further actions may be initiated, if for example a switch 15 of the smartboard 1 is actuated, before a card 19 is attached thereto. Visual or other information can be retrieved or assignments may be made to the ID number of the respective card 19. For example an assignment may be created such as «the next photo, which is taken by a camera assigned to the smartboard 1, is linked in a database to the ID number of that card 19, which was attached to the switch 15». Thus for example the picture of a person, which shall be appointed as project manager, or a picture of an architectural model, the realisation of which shall take place, may be assigned to a card 19. When actuating the switch 15 again, the corresponding picture can be shown on the display. If a number of cards 19 are arranged one above the other, the corresponding pictures of all these cards 19 are displayed. These are just a few examples. A management system may contain a plurality of presentation programs, which comprise various instructions for work with the smartboard 1 and the different objects 17, 19, 21, 23, 25, 28. Correspondingly a management system may include one or more boxes of cards 19 of different groups, wherein the ID numbers of individual cards 19 have already been recorded in a database and brought into correlation with certain information.

A further set 16 again includes a smartboard 1 and objects 17, as described above. In addition it includes one or more connecting elements 21 depicted in FIGS. 8A and 8B. A connecting element 21 includes two objects 17 connected with each other by a connecting ribbon 22. The connecting ribbon 22 merely represents a visual and structural connection of the objects 17, it may be elastic. The objects 17 may be realised as cards 19 or as cans 23, as shown in FIG. 8A. When the two end points of the connecting ribbon 22 with the magnets 8 of the objects 17 are placed on the smartboard 1, an assignment can be created linking the two places of these end points with one another. This may mean a temporal sequence, a hierarchy, a togetherness or similar. The cans 23 may be realised as described in FIG. 7. In particular they may comprise a housing 14 with an interior space 24.

With a preferred embodiment of a connecting element 21, as shown in FIG. 8B, one or two further such objects 17 are movingly attached to the connecting ribbon 22. If only one object 17 has been attached, it may be understood as being a percentage value: a placing of the movable object 17 in the middle between the ends of the connecting ribbon 22 means 50%, a movement by a half to one end 25% or 75% respectively depending on the predefined starting position. The scaling cannot be resolved to a randomly fine value; the placing is detected by the NFC receivers 7 based on the placing of the RFID transponders 18.

If two objects 17 are movably arranged in the connecting ribbon 22 as shown in FIG. 8B, this can be for example interpreted as a region between minimum and maximum, which are respectively defined by the objects 17 at the ends of the connecting ribbon 22. Detection of the positions on the smartboard 1 happens in the same way as with a movable object 17. The connecting elements 21 may optionally be placed directly on the smartboard 1 or on cards 17 if such objects are already arranged on the smartboard 1.

The objects 17 of a connecting element 21 may be optionally realised as card 19 as described in FIG. 6, or as can 23 with an interior space 24 as described in FIG. 7.

In a further preferred embodiment a set 16 or a smartboard 1 includes an object 17 in form of a smartbook 25 as shown in FIG. 9. The prerequisite is that each NFC receiver 7 of the smartboard 1 has its own switch 15 assigned to it. A smartbook 25 includes a plate 26, the length of which extends across two or more array distances of switches 15 in the smartboard 1 and/or the width of which extends across two or more pockets 4. The plate 26 comprises a number of magnets 8 in form of ferromagnets or permanent magnets arranged in an array or grid as well as at least two RFID transponders 18 analogue to card 19 from FIG. 6. In addition a multi-page notebook 27 is attached to it, the pages of which are provided with instructions and choice variants 27a. Each of these variants 27a may have a switch 15 of the smartboard 1 assigned to it, which is arranged directly around the smartbook 25, if, when in use, it adheres to the smartboard 1. When actuating these switches 15 additional information is retrieved, which in turn may contain instructions. In addition a switch 15 may be defined, which is to be actuated when the page is completed. The page is then turned and the instructions of the next page are followed after further additional information has been retrieved.

Such smartbooks 25 may be manufactured for different workshops or projects and may guide the user or users through a process, for example through a decision process. The different aspects (price, quality, demand, risk etc.) may be respectively illuminated on a page and the variants, which are available to the users for selection, may be assigned to the surrounding switches 15 on the smartboard 1. The smartboard 1 recognises the position of the smartbook with the aid of the two RFID transponders, which correspond with the NFC receivers on the smartboard 1. Here too all information, which is entered by the users on the smartboard through actuating the switches 15, is sent to the computer and processed further in there.

Figures 10A, 10B:
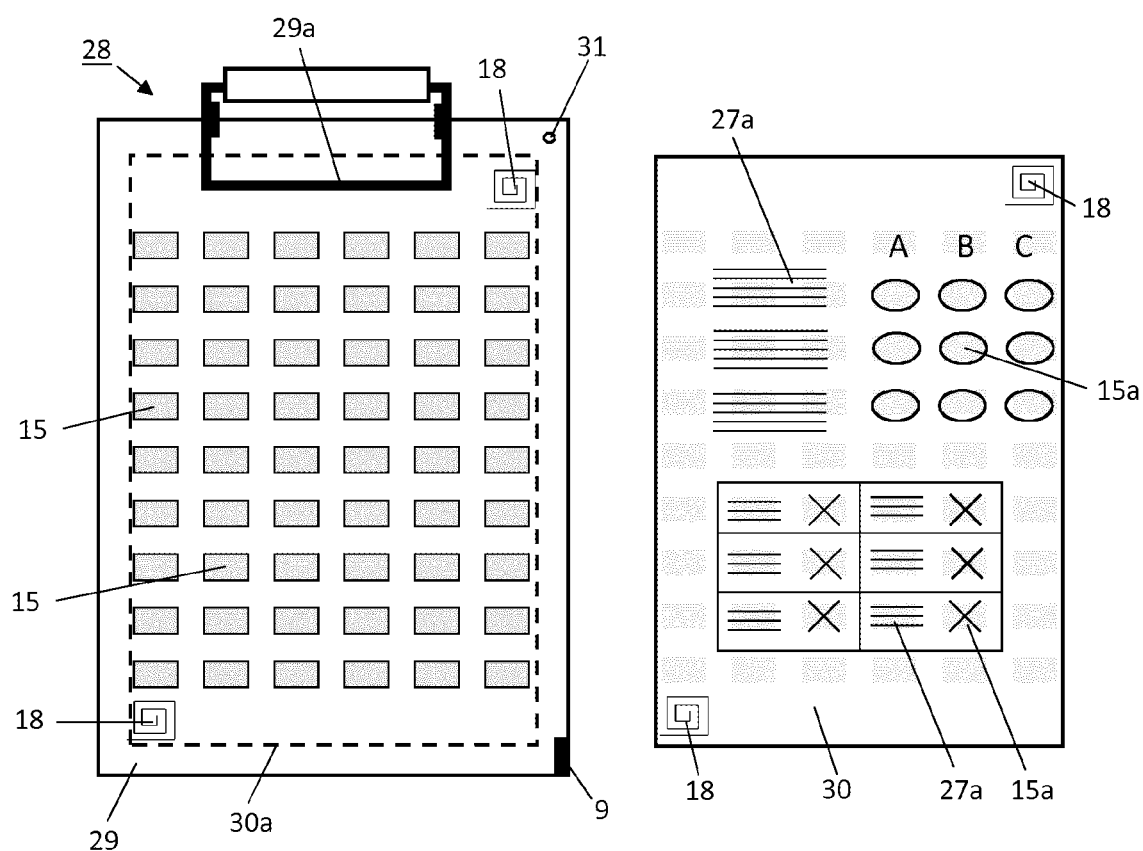
FIGS. 10A, 10B show a schematic view of an inventive clipboard (FIG. 10A) and a suitable sheet of paper (FIG. 10B).

Moreover an inventive clipboard 28 as shown in FIG. 10A can be used alone or as an additional module with the smartboard 1 or with a named set 16. An inventive clipboard 28 consists of a base 29 with a fastening 29a for a sheet of paper 30 as depicted in FIG. 10B and is provided with at least one, preferably two RFID transponders 18. The sheet of paper 30 itself also includes one or two RFID transponders 18, wherein at least one RFID transponder 18 each of the base 29 and of the paper sheet 30 are arranged to be close to each other for communication, when the sheet of paper 30 is fixed to the fastening 29a. The base 29 comprises a marking 30a, which indicates where exactly the sheet of paper 30 is to be placed. The base 29 includes also a plurality of switches 15, preferably arranged in a matrix. They may be marked or arranged hidden behind a surface. As with the smartbook 25 the sheet of paper 30 may also be part of an accumulation of prefabricated sheets of paper 30. Each of these sheets 30 is provided with various information, instructions and choice variants 27a as well as with a number of marking fields 15a, which are respectively arranged at the locations of the switches 15 of the clipboard 28, when the sheet 30 is fastened at the marking 30a of the base 29. The user respectively actuates, depending on the situation, the corresponding switches 15 by for example pressing them. In FIG. 10B the marking fields 15a, which he can selectively actuate, are marked by circles arranged below the letters A, B and C. Further marking fields 15a are located where to the crosses are in the lower table. Depending on what is applicable the user actuates the corresponding switches 15 on the clipboard 28, by pressing on the marking fields 15a.

Preferably, every switch 15 is realised as a push button. The clipboard 28 may additionally include a port 9, which may also be a wireless interface, with which the recorded data is transmitted to a computer 10.

The clipboard 28 may also include one or more LEDs 31 in order to give feedback for actions performed or in order to receive information. For example a lit LED 31 may indicate that information regarding a certain subject matter is displayed on a screen.

The set 16 including a smartboard 1 and an object 17, wherein the object is a card 19, a can 23, a connecting element 21 or a clipboard 28, is not marked as such in the figures. The objects 19, 21, 23 and 28 are merely shown on their own, without smartboard 1. Only the set 16 including a smartboard 1 and a smartbook 25 is depicted in FIG. 9. The object 28 according to the invention which was described here may according to the invention also be used on their own or in combination with other objects 17, 19, 21, 23, 25 and 28.

| List of reference symbols | |
|---|---|
| 1 smartboard | 1a eyelets |
| 2 first surface; | 2a felt mat |
| 3 second surface; | 3a plastic plate |
| 4 pocket | |
| 5 joint | |
| 6 printplate | 6a first printplate |
| 7 NFC receiver | |
| 8 magnet, ferromagnet or permanent magnet | |
| 9 port | 9a electrical connection |
| 10 power supply, computer | |
| 11 roll | |
| 12 axis | |
| 13 recess | |
| 14 housing | 14a housing part |
| 15 switch, pressure switch | 15a marking field for a switch |

-continued

List of reference symbols

| | |
|---|---|
| 16 set | |
| 17 object | |
| 18 RFID transponder | |
| 19 card | |
| 20 coding, notch | |
| 21 connecting element | |
| 22 connecting ribbon | |
| 23 can | |
| 24 interior space | |
| 25 smartbook | |
| 26 plate | |
| 27 notebook | 27a information, instructions, choice variants |
| 28 clipboard | |
| 29 base | 29a fastening |
| 30 sheet of paper | 30a marking for a sheet of paper |
| 31 LED | |

The invention claimed is:

1. A smartboard for digitising workshop results, including a first and a second surface, which are designed parallel to one another,
wherein between the first and second surfaces a plurality of pockets are arranged parallel to one another, wherein in each pocket one or more electrically interconnected printplates are arranged, which include a plurality of NFC receivers in an array, wherein a plurality of magnets in form of ferromagnets or permanent magnets are also arranged in an array in each pocket, wherein the printplates of adjacent pockets are electronically connected with each other and a first of the printplates is provided with a port for a power supply and for a data output.

2. The smartboard according to claim 1, wherein the pockets are hingedly connected to each other, so that the smartboard can be rolled up into a roll with an axis parallel to the pockets.

3. The smartboard according to claim 1, wherein the printplates comprise recesses, in which the magnets are mounted.

4. The smartboard according to claim 3, wherein the magnets are permanent magnets mounted such that the magnets are capable of aligning themselves.

5. The smartboard according to claim 1, wherein the pockets comprise pressure-proof housings, in which the printplates and the magnets are located.

6. The smartboard according to claim 1, further comprising one or more switches, which can be triggered by a user, wherein the one or more switches are connected to the port for data output.

7. The smartboard according to claim 6, wherein each NFC receiver has its own switch assigned to it.

8. The smartboard according to claim 7, wherein each switch can be actuated from at least one of the first surface and the second surface by a user pressing the at least one of the first surface and the second surface.

9. The smartboard according to claim 1, wherein at least the first surface is made of a flexible material which can be perforated by a pin or a needle.

10. The smartboard according to claim 1, wherein at least the second surface is made of a pressure-proof material.

11. The smartboard according to claim 10, wherein the second surface forms a low-gap surface, when the smartboard is completely unwound.

12. A set including the smartboard according to claim 1 and two or more objects, wherein each object includes at least one magnet in form of a permanent magnet or ferromagnet as well as at least one RFID transponder.

13. The set according to claim 12, wherein one or more of the objects also includes a switch.

14. The set according to claim 12, wherein one or more of the objects are realised as a card and comprise a coding.

15. The set according to claim 12, wherein two of the objects are connected with each other by a connecting ribbon to form a connecting element.

16. The set according to claim 15, wherein one or two further such objects are movably attached to the connecting ribbon.

17. The set according to claim 15, wherein each object of the connecting element is realised as a can with an interior space.

18. The set according to claim 17, wherein all magnets of the objects are realised in form of permanent magnets and mounted in the interior space such that they can freely align themselves.

19. The set according to claim 12, further comprising a smartbook with a plate, the length of which extends across two or more array distances of switches in the smartboard and/or the width of which extends across two or more pockets, wherein the plate comprises several magnets in form of ferromagnets or permanent magnets arranged in an array or grid as well as at least two RFID transponders, wherein a multi-page notebook is attached to the plate, the pages of which are provided with instructions and choice variants, wherein each variant may have a switch of the smartboard assigned to it, which, when in use the smartbook is attached to the smartboard, is directly arranged around the smartbook.

20. The smartboard according to claim 1, comprising a clipboard realised as a base for a sheet of paper and a fastening therefore, wherein the base is provided with at least one, preferably two RFID transponders, as well as at least one sheet of paper with a RFID transponder, wherein a RFID transponder each of the base and of the paper are arranged so as to be close to each other for communication.

21. The smartboard according to claim 1, further comprising at least one LED, which can indicate feedback for performed actions.

* * * * *